(12) United States Patent
O'Keefe

(10) Patent No.: US 7,455,904 B2
(45) Date of Patent: Nov. 25, 2008

(54) THERMAL INFRARED REFLECTIVE PIGMENTS FOR COATINGS

(75) Inventor: Eoin O'Keefe, Farnborough (GB)

(73) Assignee: Qinetiq Limited (GB)

( * ) Notice: Subject to any disclaimer, the term of this patent is extended or adjusted under 35 U.S.C. 154(b) by 160 days.

(21) Appl. No.: 10/563,518

(22) PCT Filed: Jul. 12, 2004

(86) PCT No.: PCT/GB2004/003005

§ 371 (c)(1),
(2), (4) Date: Jul. 5, 2006

(87) PCT Pub. No.: WO2005/007754

PCT Pub. Date: Jan. 27, 2005

(65) Prior Publication Data

US 2006/0159922 A1  Jul. 20, 2006

(30) Foreign Application Priority Data

Jul. 11, 2003  (GB)  .................................. 0316198.1

(51) Int. Cl.
*B32B 5/16* (2006.01)
*B05D 7/00* (2006.01)
*C25D 15/02* (2006.01)

(52) U.S. Cl. ........................ 428/403; 427/189; 427/201; 204/192.1; 204/471; 204/473

(58) Field of Classification Search ................ 428/403, 428/189, 201, 212; 204/192.1, 471, 473
See application file for complete search history.

(56) References Cited

U.S. PATENT DOCUMENTS

| 4,916,014 A | * | 4/1990 | Weber et al. ................ 428/403 |
| 5,811,180 A | | 9/1998 | Berdahl |
| 6,022,911 A | | 2/2000 | Hashizume et al. |
| 6,194,484 B1 | | 2/2001 | Hugo |
| 6,235,105 B1 | | 5/2001 | Gulden et al. |
| 6,376,075 B1 | * | 4/2002 | Tacke-Willemsen et al. 428/402 |

FOREIGN PATENT DOCUMENTS

| DE | 10010538 | 9/2001 |
| EP | 0065207 | 11/1982 |
| GB | 1 306 754 | 2/1973 |
| JP | 3195780 | 8/1991 |
| JP | 11 302558 | 11/1999 |
| JP | 2002309157 | 10/2002 |
| WO | WO 03/014228 | 2/2003 |

* cited by examiner

*Primary Examiner*—H. T Le
(74) *Attorney, Agent, or Firm*—McDonnell Boehnen Hulbert & Berghoff LLP

(57) ABSTRACT

This invention relates to the control of radiant thermal energy and more specifically to highly Thermal Infrared ($IR_T$) reflective pigments for use in decorative coatings for buildings or other areas where the control of $IR_T$ energy and visual decoration are required. Control of the spread of thermal energy in domestic building through passive techniques reduces energy consumption by reducing reliance on heating in cool environments and cooling air-conditioning in warm environments. A number of paint formulations having low emissivity in the thermal infrared exist which are based on variants of conventional decorative paint fluids. There are a number of problems associated with such formulations such as susceptibility to damages and high emissivity for certain colour pigmentations. The present invention proposes a low emissivity flake (1) for use in a paint formulation which substantially overcomes the problems associated with the prior art.

17 Claims, 3 Drawing Sheets

THERMAL INFRARED REFLECTIVE PIGMENTS FOR COATINGS

BACKGROUND OF THE INVENTION (1) Field of the Invention

This invention relates to the control of radiant thermal energy and more specifically to highly Thermal Infrared ($IR_T$) reflective pigments for use in decorative coatings for inhabited buildings or other areas where the control of $IR_T$ energy and visual decoration are required.

(2) Description of the Art

Control of the spread of thermal energy in domestic buildings through passive techniques reduces energy consumption by reducing reliance on heating in cool environments and cooling air-conditioning in warm environments.

Convection as 'draughts' and conduction are widely recognised heat transport mechanisms and many materials and methods have been developed to reduce their effect on energy consumption in structures. Thermal energy may also be transported through radiative processes. Humans readily perceive conduction and convection processes but are less sensitive to radiative heat transfer from surfaces at near ambient temperatures. It is possible to control radiative thermal energy transport processes to reduce or promote heat transfer into a room using appropriate surface coating materials. For example metal reflectors, usually aluminium, are used in roof and wall cavity insulation materials where a layer of the metal is bonded to the insulation surface to reduce $IR_T$ energy radiating from the surface. However, the use of such highly $IR_T$ reflective materials is currently restricted to areas where decorative appearance is not a primary concern, for example in loft spaces and in cavity wall voids.

Conventional, unmodified, decorative paints typically comprise a mixture of colour pigments in a solvented, optically clear film-forming material known as the binder. The binder is conventionally an organic polymer in decorative coatings for inhabited environments. Paints may also contain a wide range of additional materials such as flow improvers, wetting promoters etc., in small quantities. In addition to binding the colour pigments to the substrate, the binder also provides other desirable properties such as the gloss, abrasion resistance and corrosion or biological attack resistance.

A number of paint types based on variants of conventional decorative paint fluids with increased $IR_T$ reflectivity exist in the literature.

Type 1 $IR_T$ reflective coatings are based on scattering granular pigments chosen and graded to maximise reflectivity in the $IR_T$ waveband. U.S. Pat. No. 5,811,180 (Paul Berdahl, "Pigments which reflect radiation from fire") describes a paint of this form.

However, these formulations have relatively low reflectivity in the $IR_T$ waveband due to absorption in the pigment particles, multiple reflections leading to long path lengths through the organic polymer binder and poor scattering due to small differences in refractive index of the binders and conventional granular pigments at $IR_T$ wavelengths. Reflectivities in the $IR_T$ waveband of greater than 0.3 are difficult to achieve in coloured coatings based on scattering granular pigments.

Type 2 highly $IR_T$ reflective paints have been developed that use metal flake pigments to provide the $IR_T$ reflector component. EP0065207 (Herberts & Co GMBH (DE), "Use of pigmented coating compounds with reduced emission capability in the spectral range of the heat radiation for camouflage purposes") describes a coating of this form. Typically aluminium flake in the size range 10 to 50 microns diameter is used as the $IR_T$ reflective pigment. Such metal-flake and binder only paints can be formulated with high reflectivities in the range 0.7 to 0.75. Using metal flakes with a surface treatment that instills a tendency to congregate and orientate at the binder outer surface (or leaf), and a binder chosen for high transparency in the $IR_T$ waveband, a paint system can be readily prepared with an $IR_T$ reflectivity of between 0.8 and 0.85. The disadvantage of Type 2 paints formed purely from appropriately sized metal flakes such as 30 μm diameter aluminium flakes is aesthetic, since they appear silver-metallic in colour when in a high $IR_T$ reflectivity formulation (or greymetallic or 'gold' in the case of metal flakes based on coloured metals such as tungsten and brass respectively). By using small metal flakes (<5 μm diameter) or roughend flakes, grey paints can be made without a metallic appearance, but there is a significant reduction in $IR_T$ reflectivity due to scattering losses.

Type 3 $IR_T$ reflective paints, achieve a coloured effect, through the combination of metal reflector flakes and conventional granular visual colour pigments in a binder. DE10010538 (Hugo Gerd, "Coating composition having spectral selective properties, useful for the coating of buidlings, comprises four different particles having a range of wavelength dependant absorption properties") describes a coating of this form. When the paint has dried, a thin layer of the binder polymer, loaded with the visual pigment, forms over the metal flakes to provide the visual colour; the 'colour layer'.

The disadvantage of this approach is that when particulate colour pigments are added to flake-containing binders, the orientation of the flakes will be disturbed so that they no longer align with each other or with the surface of the paint. The mis-alignment reduces the $IR_T$ reflectivity achievable with the paint system due to scattering related effects. The thickness of the colour layer has to be controlled to retain $IR_T$ transparency to allow the $IR_T$ radiation to reach the reflector particles and be reflected back out. To achieve high $IR_T$ reflectivity (>0.7), the colour layer thickness should be less than 5 μm. To achieve moderate $IR_T$ reflectivity (>0.5), the colour layer thickness should be less than 10 μm. The durability of Type 3 paints using a thin colour layer is limited since the removal of the thin colour layer through scuffing and abrasive cleaning etc. can reveal the presence of the metal reflector layer causing the paint to appear 'silvery'.

SUMMARY OF THE INVENTION

It is therefore an object of the present invention to provide a highly $IR_T$ reflective additive for use in paint (and other coating) formulations that substantially mitigates or overcomes the problems associated with prior art formulations of Types 1 to 3.

Accordingly this invention provides an infrared reflective flake comprising an infrared reflective core flake (wherein the core has a thickness of less than 0.2 μm) and an infrared transparent material which is coated on some or all of the surface of the core flake.

The flake according to the invention can be used as an additive in paint, composite gelcoat, varnish and other coating formulations to provide a highly $IR_T$ reflective coating. The invention provides a composite material comprising a $IR_T$ transparent layer which is adhered to a $IR_T$ reflective core. Generally the $IR_T$ transparent layer would be coated onto both sides of the flake core but for decorative effects only one side may be coated. The $IR_T$ transparent layer comprises a binder material with optionally a coloured material. This layer provides visual colour and mechanical strength together with chemical and environmental protection for the core material. The $IR_T$ reflective core comprises either metallic or conductive oxide material.

By removing the dependence on granular high refractive index inorganic pigments to produce decorative colour, as seen in the Type 3 prior art systems, the misalignment of flakes is alleviated and the achievable $IR_T$ reflectivity increased. Using low refractive index dyes in the reflector core coating for the coloured option minimises the detrimental increase in binder refractive index and consequential TIR losses.

The reflector layer needs to be sufficiently reflective so that it reflects the majority of incident $IR_T$. This equates to a DC electrical resistivity in the range 0.1 to 50Ω☐$^{-1}$, ideally in the range 1 to 10Ω☐$^{-1}$.

For a particular bulk resistivity, the reflector layer also needs to be sufficiently thick to reflect the majority of incident $IR_T$ radiation. However, the metal (or metal oxide) core edge thickness should be minimised to reduce scatter and subsequent losses. Therefore, the core material should ideally be less than 0.2 µm thick.

For conductive metals such as an aluminium core material, the thickness is preferably in the range 0.015 to 0.05 µm thick and more preferably in the range 0.03 to 0.04 µm. For low conductivity metals such as a chromium based core, the thickness is preferably in the range 0.08 to 0.12 µm.

If the reflector core is rough it will scatter $IR_T$ radiation and reduce $IR_T$ reflectivity when in a coating. Therefore the core material should have a surface texture of less than 1 µm with a depth to pitch ratio of less than 0.5. Preferably the texture is in the range 0.2 µm to 0.4 µm.

The reflective area of the flake core also has an effect on the $IR_T$ reflectivity. If the reflector flakes are small compared to the wavelength of radiation then loss through scattering mechanisms become important. Preferably therefore the average diameter of the flake core is greater than 10 µm. Note: although the term "diameter" is used the skilled reader would understand that the flake does not need to be perfectly circular or disc-like and that irregular shaped flakes can be used. In the event that the flake has an irregular shape the term diameter refers to the smallest dimension of the flake.

Very large flakes become difficult to align during drying of the binder systems and so preferably the flake diameter is less than 100 µm. Flakes above around 50 µm become resolvable by the human eye and so more preferably for non-metallic effect decorative coatings, the flake diameter is in the range 10-50 µm and more preferably still in the range 30-40 µm.

The layer which covers the $IR_T$ reflector core must be sufficiently transparent to transmit $IR_T$ radiation through to the reflector core without significant loss. This covering layer can therefore conveniently comprise an organic film forming polymer with low $IR_T$ absorption. Examples include polymers of ethylene, butylene, propylene, acrylate, methacrylate and styrene or copolymers thereof. Colour can be introduced through the addition of visible band dyes chosen for high specific absorption in the visible waveband, associated with electronic transitions, but weak specific absorption at $IR_T$ wavelengths due to molecular vibration. Desirable dyes include azo, xanthene and anthraquinone dyes such as solvent yellow 94, orange 1 and red 24. In this way the visual, decorative colour requirements can be met without significant reduction of $IR_T$ transparency. The radiation path length is minimised by using the minimum thickness of coloured polymer layer commensurate with providing the required level of visual colour, mechanical strength and stability to processing. This requirement is met using a minimum thickness of 0.2 µm. Reflector core coatings using organic polymer layer thickness in the range 0.2 to 2 µm are preferred.

Preferably, the infrared transparent coating material completely encapsulates the core material.

Alternatively the coloured flake binder could be inorganic. Many inorganic materials will exhibit significant transparency in the $IR_T$ wavelength range and some can be coloured using either dyestuffs, metal salts etc. or are naturally self-coloured. Examples of inorganic $IR_T$ transparent coatings would include, but are not limited to, sol gel deposited materials such as oxides of silicon, titanium or aluminium that can be coloured through the addition of dyes and pigments. Examples of self-coloured, $IR_T$ transparent materials include, but are not limited to, semiconductor materials such as silicon and germanium.

In a variant of the present invention the $IR_T$ reflective core can be made to be optically transparent. This is achieved by forming the core from a material that is transparent at visual wavelengths but remains reflective in the $IR_T$ region. Examples of materials that become optically transparent in this way are very thin layers of silver, gold, copper or their alloys. Alternatively some optically transparent oxides have significant $IR_T$ reflectivity, including, but not limited to, indium and fluorine doped tin oxides (ITO, FTO). In using these materials, an optically transparent coating can be formed that may be coloured, if required, using either the coloured organic binder or coloured inorganic coating described above. In this way a clear and, if required, colourless highly $IR_T$ reflective varnish can be made.

Preferably, the core comprises indium or fluorine doped tin oxide.

Optically transparent $IR_T$ reflective metal cores will in general be less than 1 nm thick. The actual thickness required is dependent on when it becomes sufficiently conductive. Cores become significantly $IR_T$ reflective when their electrical resistivity is less than 10Ω☐$^{-1}$.

According to a second aspect of the present invention, there is now proposed a paint formulation comprising infrared reflective flakes according to the first aspect of the present invention.

According to a third aspect of the present invention, there is now proposed a varnish formulation comprising infrared reflective flakes according to the first aspect of the present invention.

According to a fourth aspect of the present invention, there is now proposed a gel coat formulation comprising infrared reflective flakes according to the first aspect of the present invention.

DESCRIPTION OF THE FIGURES

Embodiments of the invention are described by way of example only with reference to the accompanying drawings in which.

DETAILED DESCRIPTION OF THE INVENTION

Figure 1:
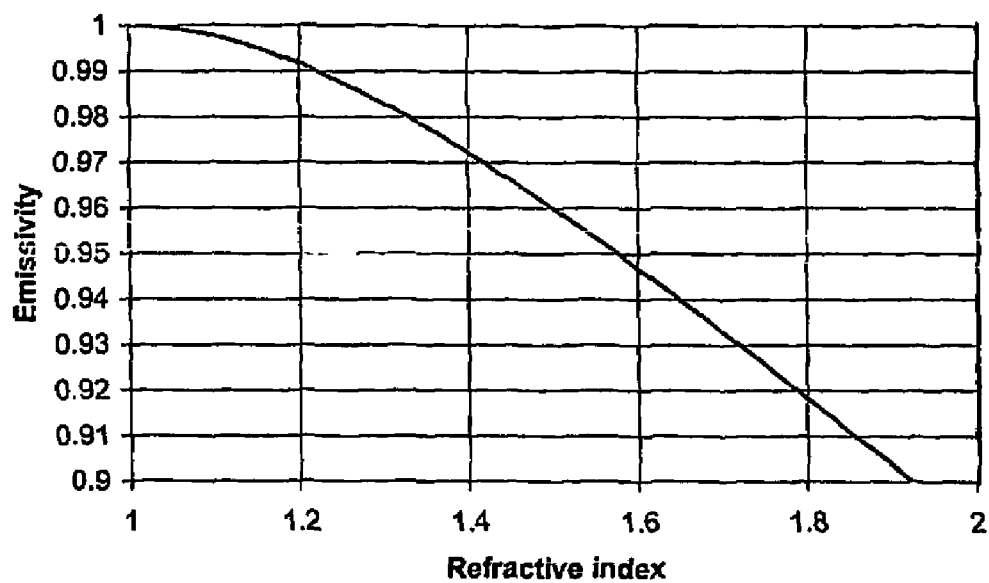
FIG. 1 shows a graph of emissivity for an air/polymer interface as a function of refractive index of the polymer, FIG. 2 relates to radiation leaving a polymer film, i.e. moving from a high to a low refractive index material, and shows the angle at which light arising within a polymer film (for example from reflective or scattering particles in the polymer) undergoes total internal reflection (TIR) and can no longer leave the surface. The figure shows a graph of total internal reflection angle as a function of refractive index of the medium.

By way of background to the present invention, all bodies above 0K (−273° C.) emit electro-magnetic (EM) radiation as a result of processes in their atomic and molecular structure. At temperatures encountered in human habitations (0 to 30° C.) this electromagnetic radiation is predominately at frequencies in the range of $3 \times 10^{12}$ to $3 \times 10^{14}$ Hz, equivalent to a wavelength of 1 to 100 μm, commonly referred to as the 'infrared region' of the EM spectrum. At temperatures in the range 0-30° C. more than 90% of the radiant energy arising from a body is in the wavelength interval 3 to 50 μm, this part of the electromagnetic spectrum is called the Thermal Infrared ($IR_T$) region.

To a first approximation, the $IR_T$ energy emitted by a surface is given by the Stephan-Boltzmann equation:

$$W = \epsilon \sigma T^4 \, Wm^{-2},$$

where 'W' is the radiated power, '$\epsilon$' is the emissivity, '$\sigma$' is the Stephan-Boltzmann constant and 'T' is the temperature in Kelvin.

In a simplified form, Kirchoffs law relates the emissivity of a material to its reflectivity and generally states that for opaque bodies:

$$\epsilon_\lambda = 1 - R_\lambda,$$

where '$\epsilon_\lambda$' is the emissivity and '$R_\lambda$' is the surface reflectivity at wavelength '$\lambda$'. Thus, reducing the emissivity of an opaque surface increases its ability to reflect radiation.

The energy reflected from an opaque body can also be related to the energy absorbed by the body according to the relationship:

$$A_\lambda = 1 - R_\lambda,$$

where $A_\lambda$ is the fractional energy absorbed by the body, it can be deduced that materials with high $IR_T$ absorption will also have high $IR_T$ emissivity and low $IR_T$ reflectivity.

Emissivity ($\epsilon$) is a property of the radiating surface material, and theoretically, can vary between 1 and 0. A surface at a given temperature with a low emissivity at $IR_T$ wavelengths will radiate less $IR_T$ energy than a surface at the same temperature with a higher emissivity at $IR_T$ wavelengths. Decorated surfaces typically encountered in inhabited environments have emissivities between 0.9 and 0.95. This is a consequence of the majority of decorative materials found in inhabited environments having organic surfaces, for example paints, timber, fabrics etc. Organic materials typically absorb $IR_T$ energy through molecular vibrations and consequently have $IR_T$ emissivities in the range 0.9 to 0.95. Conductive metal surfaces typically have low $IR_T$ emissivity.

The reflectivity of a conductive material can be related to its electrical resistivity. At $IR_T$ frequencies, materials with metallic or near metallic conductivities have reflectivity given by the equation:

$$R \sim 1 - 2\sqrt{\nu \rho} + \ldots,$$

where 'R' is the reflectivity, '$\nu$' is the frequency of radiation and '$\rho$' is the resistivity. This equation predicts that metals with low electrical resistivity will have high $IR_T$ reflectivity. Clean, smooth conductive metals at temperatures between 0 and 30° C. are opaque to $IR_T$ energy, have high $IR_T$ reflectivity, between 0.98 and 0.85, and consequently have emissivity in the $IR_T$ waveband in the range 0.02 to 0.15.

When radiation passes from one medium into another, for example from air into a polymer film, a fraction of the radiation is reflected at the air/polymer interface according to Fresnel's equation from which the reflection coefficient (R) can be derived:

$$R = \frac{(n-1)^2 + n^2 \chi^2}{(n+1)^2 + n^2 \chi^2},$$

where n is the refractive index ratio of the materials and $\chi$ is the extinction coefficient.

The refractive index of the majority of organic polymers is in the range 1.4 to 1.6 in the $IR_{Thermal}$. Using Fresnel's equation, the reflectivity of this interface is around 0.03 to 0.05, thus their emissivity is around 0.95 to 0.97 as shown in FIG. 1, where 1-R, calculated from Fresnel's equation, is plotted for refractive indices between 1 and 2.

The radiation will then propagate into the material until is either absorbed or meets another interface. Absorption occurs according to the Beer-Lambert law:

$$Abs = \chi \times C \times \iota,$$

where Abs is the absorption, $\chi$ is the extinction coefficient of an absorbing species, C is the concentration of the species and $\iota$ the path length through the material. The extinction coefficient is usually a wavelength dependant function dependent upon the resonant frequencies of the distortion of chemical bonds in the material, for example bending stretching and rotation around C—$CH_3$ bonds in polymers. To minimise absorption the concentration of absorbing moities and/or the pathlength through the material need to be minimised.

If the radiation meets another interface, then, provided the length scale of the interface is similar to the wavelength of the radiation, diffractive optics apply and the radiation is scattered. If the length scale is significantly larger than the radiation then geometric/facet optics apply and Fresnel's equation can be used to describe the interaction. As a rough guide if a feature is greater than 5 times the wavelength then geometric optics dominate. If the feature is between 5 and 0.2 times the size of a feature then diffraction effects are also significant. Where feature sizes are below 0.2 of the wavelength, the particles are sub-diffractive and effective media theories are relevant.

When radiation passes from one transparent medium to another, then the propagation undergoes a change in angle. This change in angle is related to the refractive index of the media either side of the interface and the incident angle and is described by Snell's equation:

$$n_1 \sin \theta_1 = n_2 \sin \theta_2,$$

where $n_1$ is the refractive index of the first medium, $\theta_1$ is the angle between the incident ray and the normal to the interface, $n_2$ is the refractive index of the second medium and $\theta_2$ is the angle of the refracted ray from the normal to the interface. For a given refractive index change, there is a limiting incident angle above which the radiation can no longer leave the interface, i.e. $\theta_2=90°$, known as the total internal reflection (TIR) angle $\theta_{TIR}$. This angle is given by;

$$\sin \theta_{TIR}=n_2/n_1$$

Figure 2:
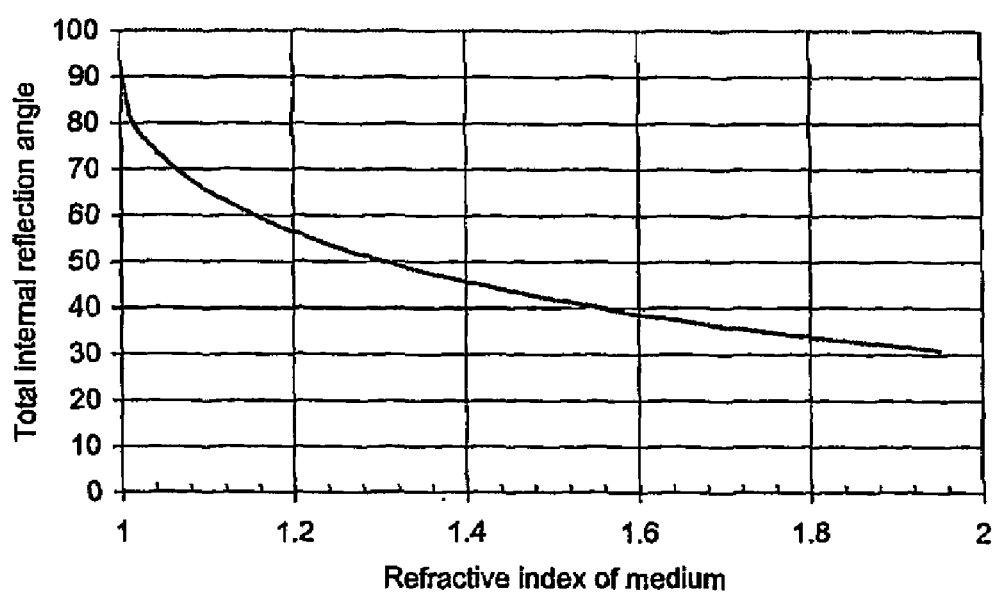

Consider radiation leaving a polymer film, i.e. moving from a high to a low refractive index material. FIG. 2 shows the angle at which light arising (say from reflective or scattering particles in the polymer) undergoes TIR and can no longer leave the surface. Lower values of $\theta_{TIR}$ imply lower reflectivity (higher emissivities) as a smaller fraction of the reflected incident light leaves the film.

For a polymer-air interface, where the refractive indices are typically in the range 1.4 to 1.6, total internal reflection occurs when the incident angle is greater than 40 to 45°. Due to the lossy nature of polymers in the $IR_T$ waveband, the radiation is absorbed in a short distance and the radiation is said to undergo total internal attenuation. It is important to reduce scatter at angles greater than 40° away from normal to the surface to maximise the reflectivity and minimise the emissivity of paints in the $IR_T$ waveband.

Films with low refractive index have high $\theta_{TIR}$. However, the effective refractive index of polymer binders is typically increased through the addition of scattering pigment particles e.g. titania, these are present to impart optical colour and opacity and are sized to have maximum scattering in the visible band but are, inadvertently, sub-scattering at $IR_{Thermal}$ wavelengths. At $IR_{Thermal}$ wavelengths the effective refractive index of a conventionally opaque paint base is increased. A binder with refractive index of 1.5 with 0.2 v/v of 200 nm diameter (sub-scattering) titania, refractive index 2.7, will have a calculated effective refractive index in the $IR_{Thermal}$ of 1.74 and consequently a value Of $\theta_{TIR}$ of 35°.

To minimise the loss of $IR_T$ energy in the binder material it is important to select materials with low extinction coefficient and to keep optical pathlengths short. The optimim case for a Type 3 coating, would be an infinite smooth reflector surface uniformly covered with a minimum thickness of binder with $IR_T$ transparent pigments to give the required colour. Scattering effects from a non infinite non-smooth reflector surfaces will increase $IR_T$ losses from TIR and increased optical pathlengths.

The combined optical effects of the addition of low aspect ratio pigment particles to form coloured $IR_T$ reflective paints is to decrease the maximum $IR_T$ reflectivity from around 0.85 for aluminum flake Type 2 paints to 0.5 for light coloured Type 3 paints, to 0.4 for medium shades of Type 3 paints and 0.3 for dark shades of Type 3 paints.

One embodiment of an $IR_T$ reflective pigment, for use in a coating compositon, which mitigates at least some of the deficiencies of the prior art approaches Types 1-3 is now described.

Figure 3:
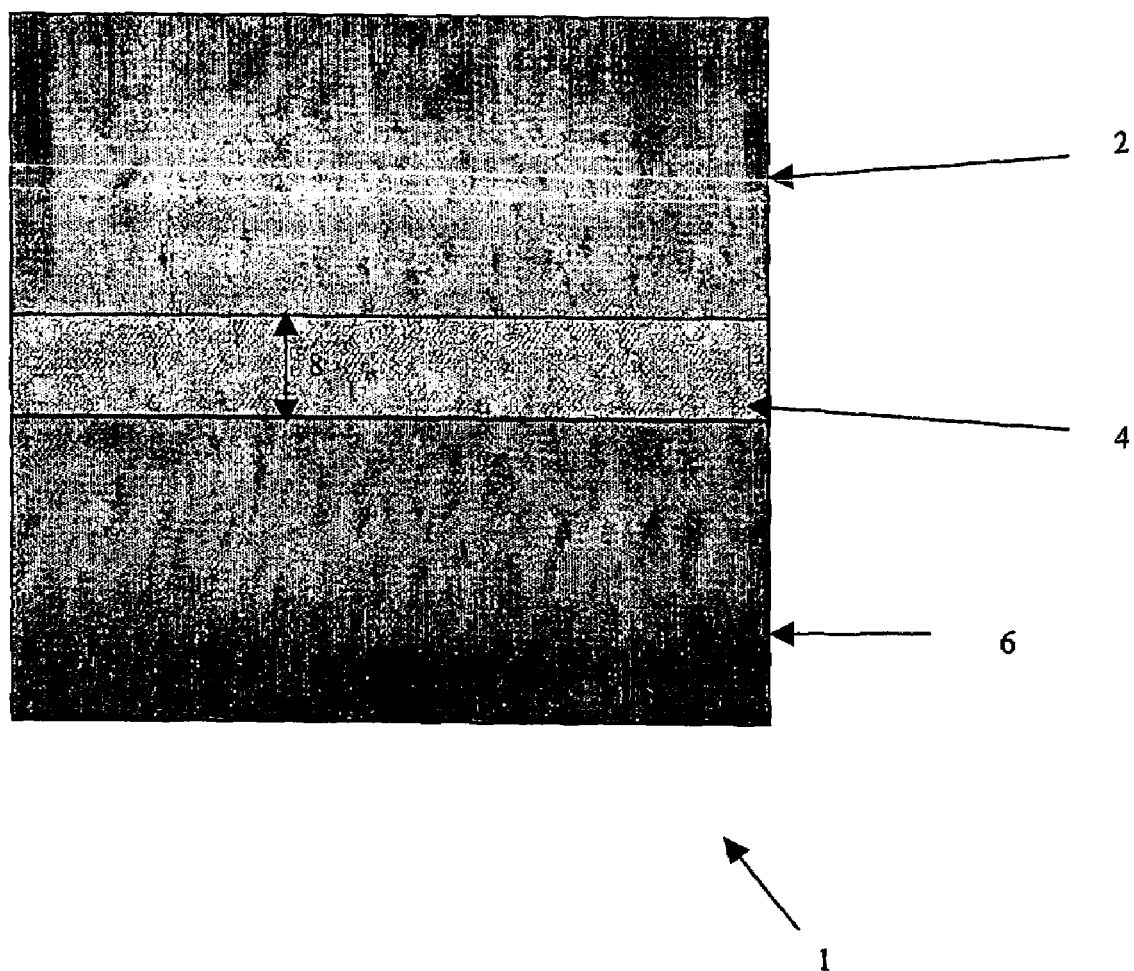
FIG. 3 shows the form of a typical $IR_T$ reflective flake according to this invention.
Figure 4:
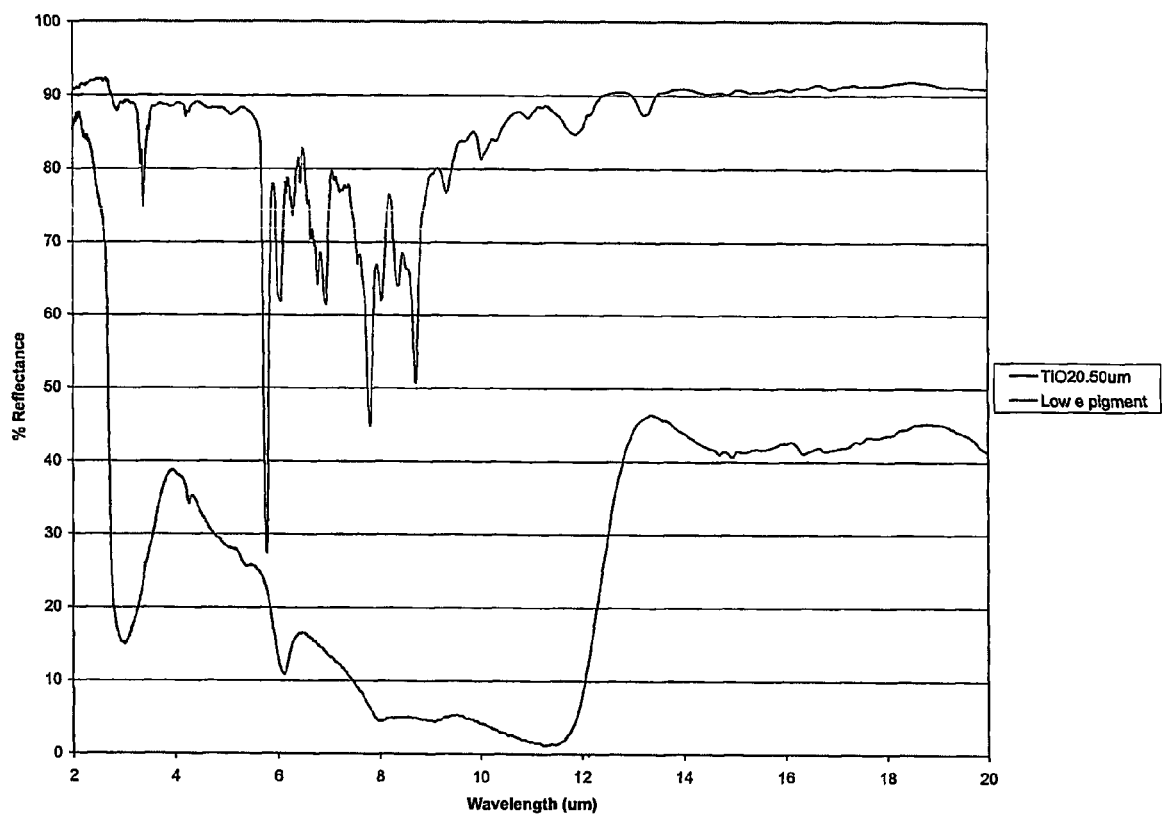
FIG. 4 shows the difference in reflectivity in the wavelength range 2 to 20 microns between a $TiO_2$ (conventional white) pigment and a typical visually coloured, highly $IR_T$ reflective pigment constructed according to the present invention. It can be seen that the highly $IR_T$ reflective pigment generally has a reflectance of approximately 90% compared to the standard pigment which varies greatly between 0 and 50% reflectance.

FIG. 3 shows a typical flake formulation according to the invention. A flake, 1, consists of a three layer structure (2, 4, 6). Layer 4 is the thin $IR_T$ reflective core flake. Layer 4 is coated on either side by colour layers 2, 6 formed from a dyed, or otherwise coloured, $IR_T$ transparent film. The colour layers 2, 6 provide mechanical strength and chemical and environmental protection to the $IR_T$ reflective core flake, 4. The $IR_T$ refective core flake, (denoted by numeral 4 in FIG. 3), can be formed from a wide variety of metals or metallic oxides but for the case where it is formed from aluminum it will typically have a thickness, (8 in FIG. 3), of between 30 and 40 nm. For a chromium core flake this thickness would be in the range 80 to 120 nm.

The colour layers, (2,6 in FIG. 3), typically will have a thickness of 200-2000 nm and comprise a film containing 1-20% wt/wt of dyes or other coloured materials.

Examples of suitable polymer binders are acrylic resins such as poly methyl, ethyl or butyl acylates. Suitable dyes include Azo metal complexes, phtalocyanines and anthroquinones.

A specific flake construction is a 800 nm (±100 nm) thick colour layer (2,6 in FIG. 3) formed from Elvacites 2041 polymer binder (produced by ICI Acrylics) with 10% wt/wt of Neozapon blue 807 (produced by BASF PLC) colour dye and a 35 nm (±5 nm) thick aluminium reflector layer (4 in FIG. 3). For such a formulation the flake has an $IR_T$ emissivity in the range 0.15-0.2 and a dark blue colour.

A flake according to this invention can be formed in a variety of ways but a preferred method of manufacture is described as follows.

A 25 µm thick sacrificial web of polyethylene terephthalate polymer film is coated with a release layer of carnuba wax. A layer of dye-containing polymer is then deposited onto the treated surfaces of the sacrificial web by either free-flow coating or gravure printing processes, dried and optionally cured. This layer will form one of the colour layers, (2,6 in FIG. 3).

A layer of aluminium is then deposited onto the surface of the dye-containing polymer by evaporation. This layer will form the $IR_T$ reflective core (4 in FIG. 3).

Optionally a second layer of coloured polymer is deposited onto the evaporated aluminium, again by a free flow coating or gravure printing process. This second polymer layer is dried and optionally cured. This layer will form one of the colour layers, (2,6 in FIG. 3).

The coated three-layer material is then removed from the web, by for example, immersion in hot water, other methods will occur to the skilled reader. The carnuba wax release layer melts and the $IR_T$ reflective material can be recovered by filtration or floatation methods. The three-layer material can be reduced to appropriately sized flakes through conventional processing, for example, wet grinding.

Other processes for making materials with the general structure in FIG. 1 will occur to the knowledgeable reader, these may include, for example, solution deposition of coloured films onto suitable size $IR_T$ reflector flakes or defining flakes on the web before removal.

Related permutations of the basic structure that will create different decorative effects will be apparent to the skilled reader. For example, combinations of colourants can be used on each side to extend the number of colours available, different colourants or combinations of colourants can be used on the upper and lower surfaces, the intensity of shade on each side can be varied independently. The reflective metal can be exchanged for a visually coloured metal, for example copper or tungsten. The metal reflector can be textured in either periodic or a-periodic structures to add visual diffraction effects or controlled diffuse reflections, respectively. This could be achieved by embossing the first coloured polymer film before deposition of the metal reflector layer. Clearly these permutations can be used in various combinations to create further decorative effects.

The invention claimed is:

1. An infrared ($IR_T$) reflective flake comprising an infrared reflective core flake and an infrared transparent material which is coated on some or all of the surface of the core flake wherein the reflective core flake has a thickness of less than 0.2 µm and wherein the core flake has a surface texture in the range 0.2 to 0.4 µm and a depth to pitch ratio of less than 0.5.

2. An infrared ($IR_T$) reflective flake as claimed in claim 1 wherein the core flake has a DC electrical resitivity in the range 0.1 to 50 $\Omega\square^{-1}$.

3. An infrared ($IR_T$) reflective flake as claimed in claim 1 wherein the core flake is aluminium and has a thickness in the range 0.03 to 0.04 μm.

4. An infrared ($IR_T$) reflective flake as claimed in claim 1 wherein the core flake is chromium and has a thickness in the range 0.08 to 0.12 μm.

5. An infrared ($IR_T$) reflective flake as claimed in claim 1 having a diameter of 10 to 100 μm.

6. An infrared ($IR_T$) reflective flake as claimed in claim 5 wherein the diameter is in the range 10-50 μm.

7. An infrared ($IR_T$) reflective flake as claimed in claim 6 wherein the diameter is in the range 30-40 μm.

8. An infrared ($IR_T$) reflective flake as claimed in claim 1 wherein the infrared transparent material comprises a non-polar or weakly polar organic polymer that optionally contains a coloured dye or other coloured material.

9. An infrared ($IR_T$) reflective flake as claimed in claim 8 wherein the infrared transparent material thickness is in the range 0.2 to 2 μm.

10. An infrared ($IR_T$) reflective flake as claimed in claims 1 wherein the infrared transparent material comprises an inorganic film that optionally contains a coloured dye or other coloured material.

11. An infrared ($IR_T$) reflective flake as claimed in claim 1 wherein the core flake has a thickess of less than 1 nm.

12. An infrared ($IR_T$) reflective flake as claimed in claim 11 wherein the DC resistivity is less than 10 $\Omega\square^{-1}$.

13. An infrared ($IR_T$) reflective flake as claimed in claim 1 wherein the core flake comprises indium or fluorine doped tin oxide.

14. An infrared ($IR_T$) reflective flake as claimed in claim 1 wherein the infrared transparent material completely encapsulates the core material.

15. A paint formulation comprising infrared ($IR_T$) reflective flakes according to claim 1.

16. A varnish formulation comprising infrared ($IR_T$) reflective flakes according to claim 1.

17. A method of controlling radiant thermal energy comprising:

providing a coating material including infrared ($IR_T$) reflective flakes, wherein the infrared ($IR_T$) reflective flakes individually comprise an infrared reflective core flake and an infrared transparent material which is coated on some or all of the surface of the core flake, said core flake having a thickness of less than 0.2 μm; and applying the coating material to a surface to form an infrared reflective coating, wherein the core flake has a surface texture in the range 0.2 to 0.4 μm and a depth to pitch ratio of less than 0.5.

* * * * *